United States Patent
Dixon et al.

(10) Patent No.: US 7,465,149 B2
(45) Date of Patent: Dec. 16, 2008

(54) TURBINE ENGINE COOLING

(75) Inventors: Jeffrey Alison Dixon, Littleover (GB);
Ivan Lars Brunton, Littleover (GB);
Timothy John Scanlon, Sunnyhill (GB);
Guy David Snowsill, Belper (GB)

(73) Assignee: Rolls-Royce plc, London (GB)

( * ) Notice: Subject to any disclaimer, the term of this patent is extended or adjusted under 35 U.S.C. 154(b) by 329 days.

(21) Appl. No.: 11/374,202

(22) Filed: Mar. 14, 2006

(65) Prior Publication Data
US 2007/0217904 A1    Sep. 20, 2007

(51) Int. Cl.
*F04D 31/00* (2006.01)
(52) U.S. Cl. .................. 415/116; 416/96 R; 416/97 R; 416/220 R
(58) Field of Classification Search .................. 415/115, 415/116; 416/95, 96 R, 96 A, 97 R, 220 R
See application file for complete search history.

(56) References Cited

U.S. PATENT DOCUMENTS

| | | | |
|---|---|---|---|
| 3,137,478 A * | 6/1964 | Farrell | 416/220 R |
| 3,397,865 A * | 8/1968 | Shaw et al. | 416/221 |
| 3,501,249 A * | 3/1970 | Scalzo et al. | 416/95 |
| 3,807,898 A | 4/1974 | Guy | |
| 3,957,393 A | 5/1976 | Bandurick | |
| 4,582,467 A | 4/1986 | Kisling | |
| 6,022,190 A | 2/2000 | Schillinger | |
| 6,065,932 A * | 5/2000 | Dodd | 416/97 R |
| 6,290,464 B1 | 9/2001 | Negulescu | |

FOREIGN PATENT DOCUMENTS

| | | |
|---|---|---|
| EP | 0 761 930 A | 3/1997 |
| EP | 0 916 808 A | 5/1999 |
| EP | 1 284 339 A | 2/2003 |

* cited by examiner

*Primary Examiner*—Igor Kershteyn
(74) *Attorney, Agent, or Firm*—W. Warren Taltavull; Manelli Denison & Selter PLLC

(57) ABSTRACT

It is known there is ingestion of hot gas flow 35 from an annular flow 36 in gas turbine engines. This flow 35 is prevented from attaching to the disc by coolant flow 32 passing through gaps in lock plates 28, 29 by creation of a barrier layer. In order to regulate and enhance this effect spacer protrusions 31 are provided between ends of lock plates 28, 29. In such circumstances the gap 30 is controlled and therefore the rate of leakage flow 32 regulated for best cooling effect. This cooling effect and cooling flow 32 can be further enhanced by providing chutes 39 for presentation of the coolant flow 32.

15 Claims, 4 Drawing Sheets

TURBINE ENGINE COOLING

FIELD OF THE INVENTION

The present invention relates to turbine engine cooling and more particularly to cooling with respect to the hot turbine stages of a gas turbine engine about the turbine blade mountings between turbine stages.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

It will be appreciated from above that the turbine blades require appropriate mounting in order to allow rotation for operational performance in creating a propulsive axial gas flow, but also that the blades must be appropriately cooled. It will be understood that turbine engine efficiency is closely related to operational temperatures and that acceptable operational temperatures are dictated to a significant extent by the material properties of the components. In such circumstances by appropriate cooling it is possible to operate these components near to and occasionally exceeding the melting points for the materials from which they are constructed.

In order to provide cooling, generally coolant air is taken from the compressor stages of a gas turbine engine. Thus, this drainage of compressed coolant air reduces engine efficiency. It is an objective to utilise coolant air flows as effectively as possible in order to minimise the necessary coolant flow to achieve a desired level of component cooling for operational performance. In such circumstances generally there are relatively intricate coolant passageways provided within the engine components which are arranged to provide cooling as the coolant passes through these passages as well as provide generally nozzle projection of the coolant flows where required into cavities in order to create turbulence with hot gas flows for a diluted cooling effect.

FIG. 2 illustrates a schematic cross-section of a prior cooling arrangement as a schematic cross-section. Thus a blade root 1 forms a shank with a locking plate 2 presented across the root 3 of the blade. With a gas turbine engine, banks of turbine blades are provided and it is necessary to provide sealing between each turbine stage of the engine. Seals 4 are provided in the form of a labyrinth seal arrangement with coolant airflow in the direction of arrowhead 5 presented upwardly into the cavity 6 formed between the mounting disc 7 for the blade 1 and the bottom of a nozzle vane defining the turbine stages. As can be seen there is a gap 8 through which hot gas is ingested to the cavity 6. It is found that the coolant leakage flow 9 generally creates a barrier layer around the surfaces of the cavity 6 particularly on the rotating surface. Previously, the coolant air 5 has been arranged to prevent excessive hot gas ingestion 8.

The lock plate acts to secure location of the blade shank such that coolant flow is contained or at least restricted below the blade shank. It will be appreciated that as described in U.S. Pat. No. 6,290,464, an area 10 adjacent the lock plate is typically of what is known as a fir tree root nature and designed to allow coolant air to flow across it at its surface and possibly through passages (not shown) in the fir tree root in order to provide cooling. As turbine engines rotate about a central shaft they are inherently circumferential and it is therefore necessary that the lock plate is segmented. In such circumstances the gaps between the lock plates allow coolant leakage into the cavity. U.S. Pat. No. 6,290,464 describes provision of an outlet nozzle in order to project coolant flow through the fir tree root coolant passages into such a cavity in order to create turbulence and therefore cooling within that cavity. Such an approach does not utilize the boundary layer created by the lockplate leakage to protect the disc rim from ingestion of hot gas through the gap.

SUMMARY OF THE INVENTION

In accordance with the present invention there is provided a lock plate for a blade mounting assembly of a gas turbine engine, the lock plate comprising spacer protrusions upon one end for regulating spacing between adjacent lock plates to provide a regulated leakage gap for coolant therethrough.

Possibly, spacer protrusions are provided at both ends of the lock plate.

Generally, the spacer protrusions comprise raised pips in the end of the lock plate.

Normally, the spacer protrusions are provided towards the edges of the end of the lock plate.

Also in accordance with the present invention there is provided a blade mounting arrangement for a gas turbine engine, the arrangement comprising a lock plate associated with a mounting disc for a plurality of turbine blades, the lock plate defined as above.

Normally, a plurality of lock plates are aligned about the mounting disc to form a circumferential collar barrier. Possibly, a spacer protrusion in one lock plate engages with an adjacent edge of the next lock plate. Possibly, such engagement is through the space protrusion entering a dimple in the adjacent edge.

Possibly, the spacer protrusions act to vary the regulating spacing by reference to operating temperature.

Additionally, a lock plate for a blade mounting arrangement may also be integrally shaped to form a chute for directed outward marginal flow adjacent the lock plate or presentation of the coolant flows substantially in alignment with the lock plate and with limited turbulence.

Possibly, the chute is formed in an end of the lock plate. Alternatively, the chute is formed intermediately between ends of the lock plate. Further alternatively, the chute is formed by a passage shaped within the width of the lock plate.

BRIEF DESCRIPTION OF THE DRAWINGS

Embodiments of the present invention will now be described by way of example and with reference to the accompanying drawings in which.

DETAILED DESCRIPTION OF THE INVENTION

Those knowledgeable with respect to lock plates utilised within gas turbine engines will understand that it is not possible to provide a complete barrier seal between lock plates. A number of lock plates are required in order to create the circumferential barrier seal around a mounting disc for turbine blades and the junctions of these plates will lead to varying degrees of coolant air leakage.

Figure 1:
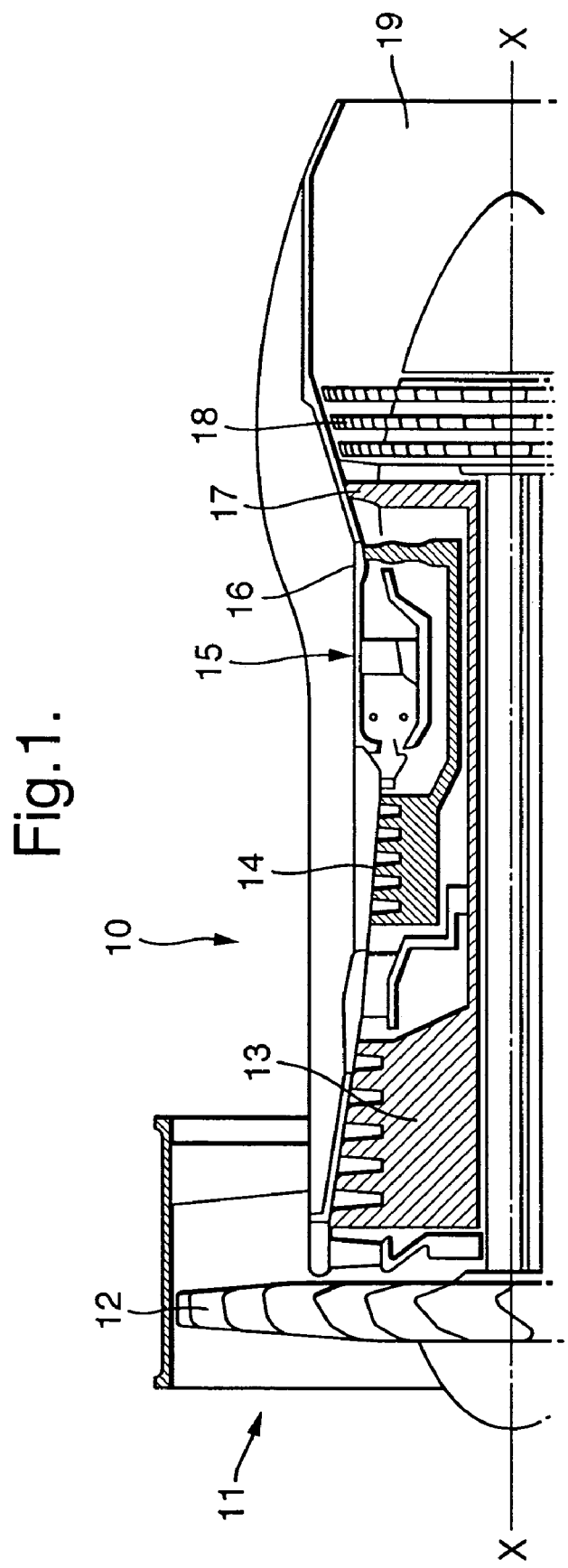
FIG. 1 is a diagrammatic cross-sectional view of a gas turbine engine.
Figure 2:
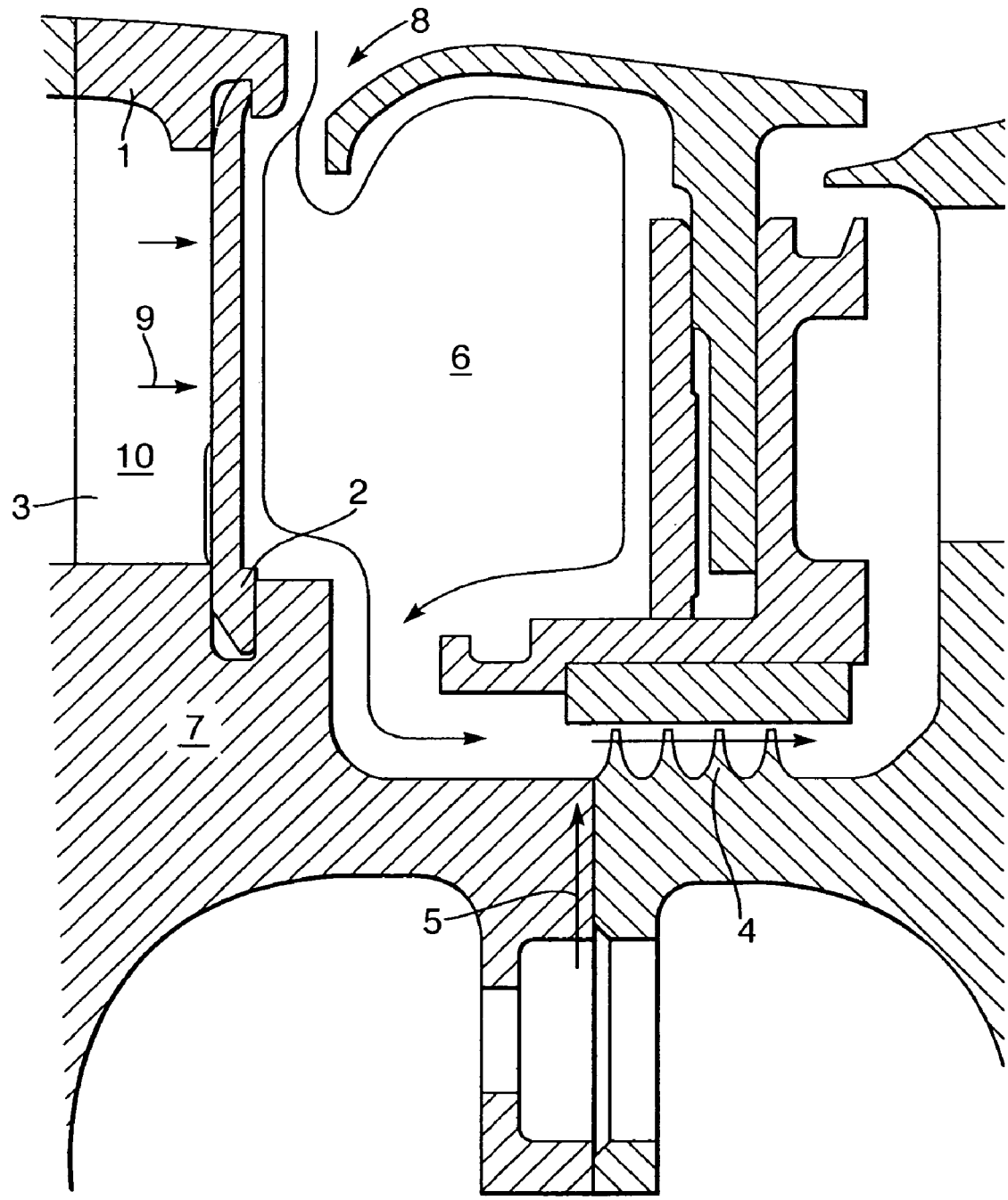
FIG. 2 is a schematic cross section of a prior cooling arrangement for a blade mounting arrangement.

Recent behavioural studies have indicated that cooling air emerging from lock plate type gaps into a turbine stator cavity 6 (FIG. 2) in the presence of a net gas ingestion at the rear of a turbine mounting disc has beneficial effects with respect to cooling. Net gas ingestion occurs when the flow requirement of an inter-stage labyrinth seal exceeds the supply of cooling air to the upstream stator well, that is to say resulting in a supplementary flow drawn from the turbine main annular gas flow drawn through the gap between the rotor and stator platforms.

Observation of this cooling air and gas ingestion has shown that the leakage air from the lock plate is retained within a disc rim boundary layer having a disproportionately beneficial effect on disc rim cooling when hot air ingestion is also present. Thus, there is a relatively enhanced effective cooling of the rotor by a relatively small coolant air supply provided by that lock plate to lock plate end gap leakage. Unfortunately, this leakage as indicated previously is variable with prior arrangements. Nevertheless, by providing more regulation with respect to this leakage it will be possible to provide significant savings in cooling air supply compared with more traditional approaches.

The process by which the coolant air acts is as a result of jets of higher pressure cooling air emerging from the lock plate between the lock plate end faces into the stator well cavity at the rear of a disc rim. This coolant air is held within the boundary layer travelling radially inwards towards the labyrinth seal rather than penetrating through the boundary layer. Clearly, coolant air retained adjacent to the cavity wall surfaces will have an enhanced effect with respect to cooling. It will also be understood that this effect increases the relative amount of coolant air and reduces the amount of annulus gas in the boundary layer significantly again maintaining relatively low local temperatures. For information and as indicated above, it was previously considered necessary to assume a thorough mixing of the ingested hot annulus gas and the cooling air and applying cooling at this composite temperature to all surfaces in the front cavity of the stator well including the disc rim rear shoulder.

It will be understood that hot gas ingestion occurs whenever the cooling flow supplied to the rim gap is less than the critical value required to seal the rim gap. In the case of an inter-stage seal cavity where the labyrinth seal clearance is such that the cooling flow is drawn off to the lower pressure "sink", downstream of the stage nozzle guide vane, leaving the gap at the rear of the upstream rotor short of the necessary flow requirements to create the seal at the annulus. Thus, as engines complete more and more service cycles and the inter-stage seals tend to wear there is also an increase in the clearances and redistributing the normally fixed level of coolant flow towards the rear stator well. This increases the risk of hot gas ingestion in the front of the well.

It will be understood that cooling is a safety as well as operational priority so there is a requirement to ensure that there is always sufficient cooling air supply even when worst wear clearances are experienced. There is a balance between the cooling supply and hot gas ingestion dependent upon many factors including the static pressure in the gas turbine annulus, the losses in the cooling air feed system, any flow dependent on a vortex, rotating hole, clearance diameters or seal clearance subject to a combination of rotor speeds, the main annulus pressure ratios and transient effects such as seal clearances. In such circumstances, a range of conditions over which hot gas ingestion may occur and the level of ingestion will certainly vary. However, since entrainment flow is speed dependent, engines are normally most vulnerable at maximum shaft speeds.

Prior sealing systems deliver the bulk of the rim sealing air flow via radial holes in a disc drive arm. In addition to not making best use of the air flow cooling the disc rim, considerable work is put into the air to accelerate it to the speed of the rotor. This has a negative effect upon turbine efficiency. Thus, as the present invention utilises less cooling air it will be appreciated that less cooling air will require acceleration to the rotor speeds. Additionally, a significant proportion of the work done in accelerating the air to the speed of the rotor is recovered by directing the cooling air against the direction of rotation.

As indicated above it is necessary to regulate and meter the leakage flow between the lock plates in order to take full advantage of the boundary layer cooling effects. Thus, spacer protrusions are used in accordance with the present invention in order to regulate the gap between the ends of the lock plates. In such circumstances, there is a coolant leakage flow through the gaps between the lock plates and as described previously this is retained adjacent to the cavity wall even in the presence of the hot gas ingestion effect described above. It will be appreciated that chutes may also be provided in order to further enhance this leakage coolant air flow adjacent to the cavity wall.

Figure 3:
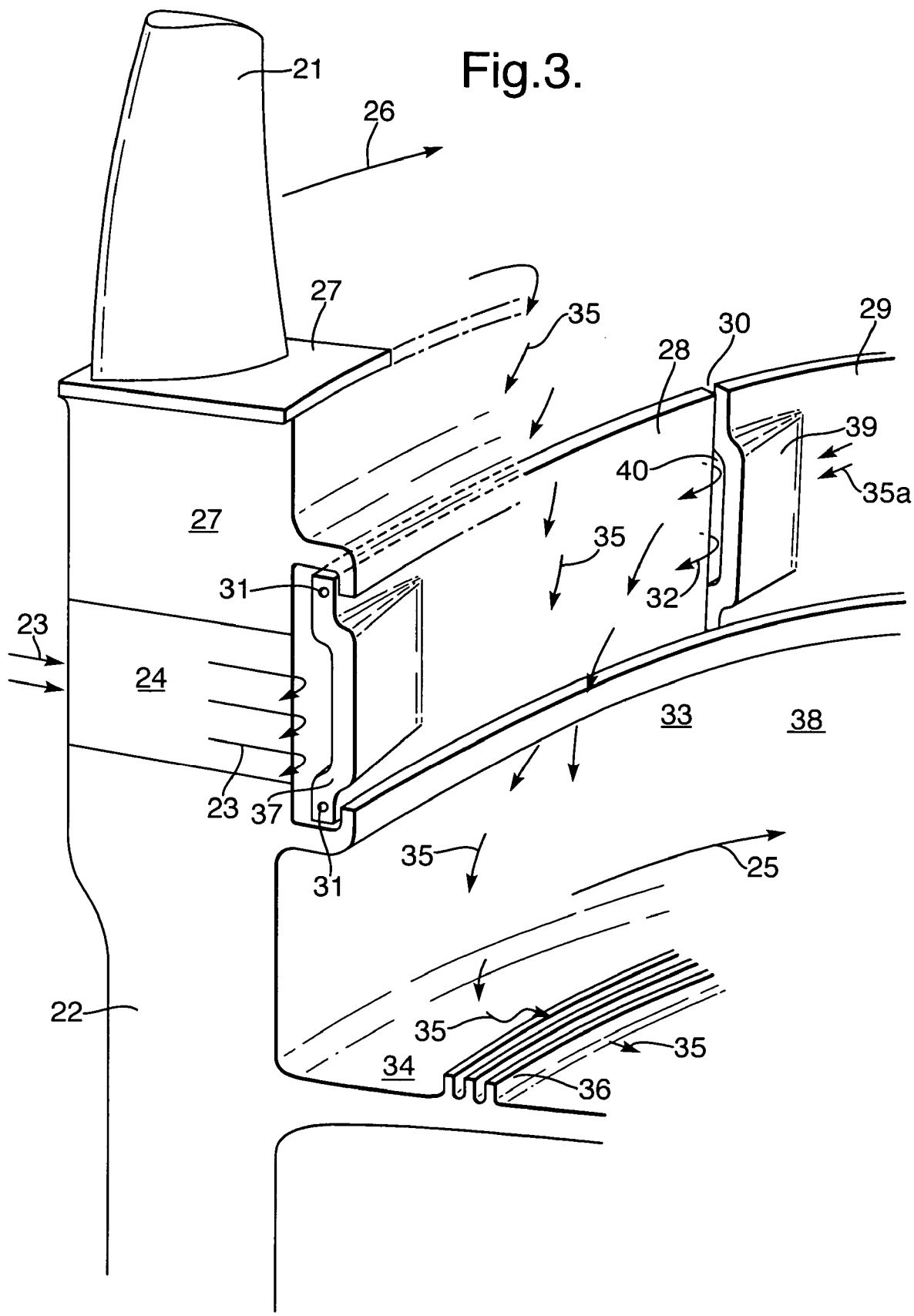
FIG. 3 is a schematic illustration of a blade mounting arrangement incorporating a lock plate in accordance with the present invention.

Referring to FIG. 3, as can be seen a blade 21 is mounted upon a rotor disc 22 such that there is air flow 23 about a blade fixing region 24. It will be understood that in operation the whole arrangement rotates in the direction of arrowhead 25 such that there is a hot annulus gas flow in the direction of arrowhead 26. The arrangement will comprise a multitude of blades 21 assembled around the rotor disc 22 with blade platforms 27 abutting each other. The blades 21 through their root sections 27 and parts of the blade rotor 22 itself create mountings for a lock plate 28 and associated adjacent lock plates 29 in order to form a circumferential barrier between blades 21 in stage sets of a gas turbine engine.

As described previously, coolant and other flows are utilised in order to create seals but through analysis it has been found that there is ingestion of hot annulus gas 26 between the blade platforms 27 and the NGV platform and into cavities about the rotor disc 22 and adjacent the lock plates 28, 29. A proportion of the coolant flow 23 inherently will leak through the gap 30 between adjacent lock plates 28, 29. The present invention utilises spacer protrusions 31 at the ends of the lock plates 28, 29 in order to control and regulate the size of the gap 30. By controlling and regulating the size of the gap 30 it will be understood that there is a metering of the coolant flow through the barrier created by the lock plates 28, 29 and others. By regulating the coolant flow depicted by arrowheads 32 it will be understood that the identified advantage of the coolant leakage flow 32 creating a barrier layer can be more appropriately utilised to ensure that that coolant flow 32 remains substantially adjacent to the lock plate 28, 29 and wall 33, 34 of the disc cavity in order to enhance the cooling effect dis-proportionately of the coolant flow 32. In such circumstances more efficient use of the coolant leakage flow 23 and flow 32 is provided. The ingress hot gas flow 35 is prevented from coming into direct contact with rotor surfaces 33 and 34 by the entrainment of the coolant leakage flow 32 in the disc boundary layer.

Figure 4:
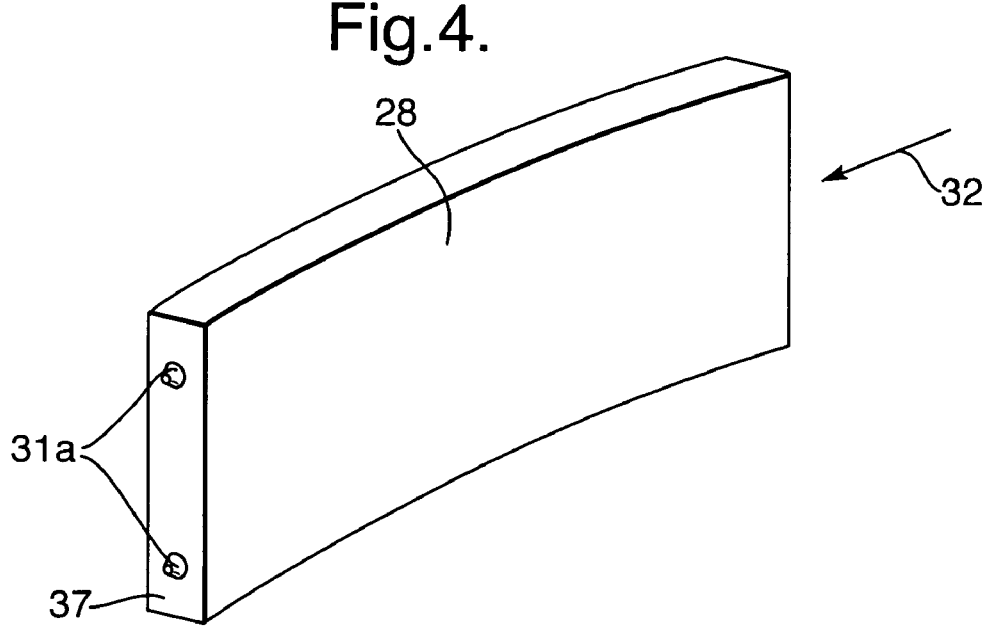
FIG. 4 is a schematic illustration of a lock plate in accordance with the present invention.
Figure 5:
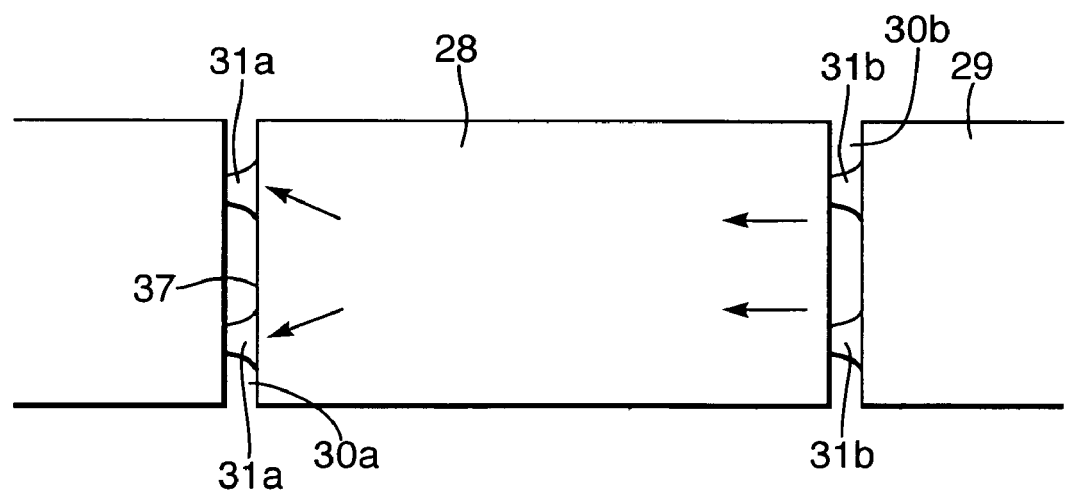
FIG. 5 is a schematic front illustration of lock plates in accordance with the present invention associated together in use.

FIGS. 4 and 5 respectively show a schematic perspective view of the lock plate 28 and a schematic side view of lock plates 28, 29 associated in accordance with creation of the regulated gap 30. Thus, as can be seen the spacer protrusions 31 are formed in an end 37 of the lock plate 28. These spacer protrusions 31 take the form of pips cast into the lock plate 28 upon manufacture. The actual shape, height and width of the spacer protrusions 31 can be accurately machined and shaped as required subsequent to any casting or other forming processes with respect to the lock plate 28. In such circumstances, an accurate gap 30 can be created between the lock plates in order to regulate coolant airflow in the direction of arrowhead 32.

As can be seen, gaps 30a, 30b can be provided between each lock plate 28, 29 and others by spacer protrusions 31a, 31b. The spacer protrusions prevent chocking and provide a controlled minimum gap to allow cooling air into the stator well cavity 38 (FIG. 3) for particularly cooling of the wall 33 of the rotor disc 22. It will also be understood that by appropriate choice of the spacer protrusions 31 even sized gaps 30 can be provided throughout the circumference of the barrier created by the lock plates 28, 29, etc or specific minimum regulation with respect to the gap 30 created to varying degrees at different circumferential positions dependent upon cooling requirements.

It will be appreciated that in order to utilise the entraining effect of the coolant leakage flow 32, axial direction of the leakage coolant flow 32 should be as low as possible. In such circumstances tangential jet projection of the flow 32 should be promoted. In order to achieve this as well as utilising the rotational movement of the disc 32 in the direction 25, a chute 39 may be provided. This chute 39 essentially creates an open orifice which extends advantageously for most of the width of the lock plate 29. A similar chute will be provided at one end of the lock plate 28. By provision of the chute 39 it will be appreciated that the coolant leakage flow 32 will be preferentially entrained in the disc boundary layer, protecting the disc surfaces 33 and 34 from the effects of hot gas ingestion 35.

The chute 39 may be created by casting or other shaping or moulding of the lock plate 29 during manufacture. The degree of inward projection of the chute 39 in order to create the aperture or orifice 40 will be chosen to achieve best operational effect. It will be understood that the flow 35a may act through a Venturi effect to enhance drawing of coolant flow 32 through the regulated gap in order that by appropriate choice of the gap 30 size by choice of the spacer protrusions 31 and subsequent chute 39 dimensions better and more efficient use of the coolant flow 32 can be made.

As can be seen in FIGS. 3 to 5 the spacer protrusions 31 are generally located towards the edges of ends 37 in order to engage an end of an adjacent lock plate. Such a location facilitates provision of a chute 39 but where necessary the spacer protrusions 31 may be located more centrally and more than two such protrusions provided.

The protrusions 31 as illustrated generally abut a flat opposing lock plate end surface (FIG. 4). However, where desired the spacer protrusions may enter opposing dimples in the end surface of an adjacent lock plate for positional location. It will also be possible through use of appropriate materials to arrange for the spacer protrusions to alter in dimensions with temperature in order to alter the minimum gap for leakage coolant flow 32.

Modifications and alterations to the embodiments of the invention described above will be understood by those skilled in the art. Thus, for example, the end surfaces of the lock plates may be chamfered or rounded to again facilitate smooth leakage coolant flow adjacent to the lock plate or the spacer protrusions designed to act upon an opposed compressable surface of the lock plates in order to maintain gap width despite thermal expansion.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A lock plate arrangement comprising at least two lock plates for a blade mounting assembly of a gas turbine engine, the lock plate arrangement characterized in that each of the at least two lock plates comprises at least one spacer protrusion at one end to abut an opposing lock plate end surface and regulate spacing between the ends of adjacent lock plates to provide a regulated leakage gap for coolant flow.

2. A plate as claimed in claim 1 wherein spacer protrusions are provided at both ends of at least one lock plate.

3. A plate as claimed in claim 1 wherein the spacer protrusions comprise raised pips in the end of at least one lock plate.

4. A plate as claimed in claim 1 wherein the spacer protrusions are provided towards the edges of the end of at least one lock plate.

5. A plate as claimed in claim 1 wherein the spacer protrusions act to vary the regulating spacing by reference to operating temperature.

6. A blade mounting arrangement for a gas turbine engine, the arrangement having a plurality of turbine blades being arranged such that there is ingestion of hot gas flow between the blades due to function of the blades, lock plates being provided radially outwardly of a cooling cavity, and a coolant leakage flow for cooling of that cavity, the arrangement characterized by comprising the lock plates associated with a mounting disc for the plurality of turbine blades, as claimed in claim 1, whereby the coolant leakage flow is retained adjacent the walls of the cooling cavity and/or lock plate by the tangential direction of the coolant leakage flow as an entraining barrier layer.

7. An arrangement as claimed in claim 6 wherein a plurality of lock plates is aligned about the mounting disc to form a circumferential collar barrier.

8. An arrangement as claimed in claim 6 wherein a spacer protrusion in one lock plate engages with an adjacent edge of the next lock plate.

9. An arrangement as claimed in claim 8 wherein engagement is through the spacer protrusion entering a dimple in the adjacent edge.

10. An arrangement as claimed in claim 6 wherein the lock plate for a blade mounting arrangement is shaped to form a chute for directing coolant leakage flow adjacent the lock plate or presentation of the coolant leakage flows substantially in tangential alignment with the lock plate and with limited turbulence.

11. An arrangement as claimed in claim 10 wherein the chute is formed in an end of the lock plate.

12. An arrangement as claimed in claim 10 wherein the chute is formed intermediately between ends of the lock plate.

13. An arrangement as claimed in claim 10 wherein the chute is formed by a passage shaped within the width of the lock plate.

14. A blade mounting arrangement for a gas turbine engine, the arrangement having a plurality of turbine blades such that there is ingestion of coolant flow leakage between the blades due to function of the blades, lock plates being provided about a cooling cavity with a coolant leakage flow for cooling of that cavity, said lock plates having a spacer protrusion upon one end for regulating spacing between adjacent lock plates to provide a regulated leakage gap for coolant flow, said lock plates being associated with a mounting disc for the plurality of turbine blades, whereby the leakage flow is retained adjacent the walls of the cooling cavity and/or lock plates by the direction of the coolant leakage flow into an ingested hot gas as an entraining barrier layer wherein said spacer protrusion in one lock plate engages with an adjacent edge of the next lock plate such that the engagement is through the spacer protrusion entering a dimple in the adjacent edge.

15. A blade mounting arrangement for a gas turbine engine, the arrangement having a plurality of turbine blades such that there is ingestion of coolant flow leakage between the blades due to function of the blades, lock plates being provided about a cooling cavity with a coolant leakage flow for cooling of that cavity, said lock plates having a spacer protrusion upon one end for regulating spacing between adjacent lock plates to provide a regulated leakage gap for coolant flow, said lock plates being associated with a mounting disc for the plurality of turbine blades, whereby the leakage flow is retained adjacent the walls of the cooling cavity and/or lock plates by the direction of the coolant leakage flow into an ingested hot gas as an entraining barrier layer wherein each lock plate is integrally shaped to form a chute for directed outward marginal flow adjacent the lock plate or presentation of the coolant flows substantially in alignment with the lock plate and with limited turbulence wherein the chute is formed intermediately between ends of the lock plate.

* * * * *